(12) United States Patent
Maidanik et al.

(10) Patent No.: US 11,493,344 B2
(45) Date of Patent: Nov. 8, 2022

(54) IN-FLIGHT AZIMUTH DETERMINATION (71) Applicant: ISRAEL AEROSPACE INDUSTRIES LTD., Lod (IL)

(72) Inventors: Michael Maidanik, Rehovot (IL); Assaf Nachum, Nes Ziona (IL); Miki Livne, Rosh Ha'Ain (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/635,245

(22) PCT Filed: Jul. 30, 2018

(86) PCT No.: PCT/IL2018/050846
§ 371 (c)(1),
(2) Date: Jan. 30, 2020

(87) PCT Pub. No.: WO2019/026069
PCT Pub. Date: Feb. 7, 2019

(65) Prior Publication Data
US 2020/0370891 A1  Nov. 26, 2020

(30) Foreign Application Priority Data
Jul. 31, 2017 (IL) .......................................... 253770

(51) Int. Cl.
*G01C 21/16* (2006.01)
*G01C 21/18* (2006.01)
(Continued)

(52) U.S. Cl.
CPC ......... *G01C 21/1654* (2020.08); *G01C 21/18* (2013.01); *G05D 1/101* (2013.01);
(Continued)

(58) Field of Classification Search
CPC ...... G01C 21/16; G01C 23/00; G01C 21/165; G01C 21/12; G01C 21/24; G01S 19/49
See application file for complete search history.

(56) References Cited

U.S. PATENT DOCUMENTS 6,208,936 B1 * 3/2001 Minor ................. G01C 21/165
244/171
11,029,369 B1 * 6/2021 Higgins ............. G01R 33/0017
(Continued)

FOREIGN PATENT DOCUMENTS

| EP | 0292339 A1 | 11/1988 |
|----|------------|---------|
| EP | 1653194 B1 | 6/2014 |
| WO | 2005119387 A2 | 12/2005 |

OTHER PUBLICATIONS

Robert H. Cannon,Alignment of Inertial Guidance Systems by Gyrocompassing—Linear Theory1, Journal of the Aerospace Sciences (Year: 1961).*

(Continued)

*Primary Examiner* — Ryan Rink
(74) *Attorney, Agent, or Firm* — Dorsey & Whitney LLP (57) ABSTRACT

The presently disclosed subject matter includes a method and system directed for calculating azimuth of an airborne platform during flight based on IMU measurements, without using GNSS data, gyrocompassing or magnetometers operating on the ground for determining the azimuth.

35 Claims, 4 Drawing Sheets

(51) Int. Cl.
    *G05D 1/10*          (2006.01)
    *G08G 5/00*          (2006.01)

(52) U.S. Cl.
    CPC ......... *G08G 5/0013* (2013.01); *G08G 5/0026* (2013.01); *G08G 5/0047* (2013.01)

(56) References Cited

U.S. PATENT DOCUMENTS

| | | | |
|---|---|---|---|
| 2007/0282529 A1* | 12/2007 | Thompson | G01C 25/00 |
| | | | 701/510 |
| 2008/0269963 A1 | 10/2008 | Vos et al. | |
| 2016/0223683 A1* | 8/2016 | Boyarski | G01S 19/47 |
| 2016/0363460 A1* | 12/2016 | Sarbishei | G01C 25/005 |
| 2017/0090003 A1* | 3/2017 | Guo | G01R 35/005 |
| 2017/0146667 A1* | 5/2017 | Medagoda | G01C 21/16 |
| 2018/0180415 A1* | 6/2018 | Gallant | G01C 21/20 |
| 2019/0360802 A1* | 11/2019 | Shimaji | G01B 21/22 |
| 2020/0081030 A1* | 3/2020 | Currier | G01P 21/00 |
| 2021/0080259 A1* | 3/2021 | Babu | G01C 21/165 |

OTHER PUBLICATIONS

Christopher Konvalin, Compensating for Tilt, Hard-Iron, and Soft-Iron Effects, https://www.fierceelectronics.com/components/compensating-for-tilt-hard-iron-and-soft-iron-effects (Year: 2009).*

* cited by examiner

Pre-flight phase
- Providing an IMU within a platform 301
- Obtaining Earth's magnetic field at flight area 303
- Defining assistant frame AF and calculating transformation matrix from AF to ISF 305

In-flight phase
- Calculating flight direction in SF 307
- Calculating transformation matrix from ISF to current SF 309
- Measuring magnetic field values in SF multiple times and generating a set of equations based on respective MF measurements 401
- Calculation transformation matrix from NF to AF based on set of equations 403
- Calculating a transformation matrix from NF to SF 319
- Calculating flight direction with respect to NF 321
- Calculating azimuth 323

Fig. 4

IN-FLIGHT AZIMUTH DETERMINATION

FIELD OF THE PRESENTLY DISCLOSED SUBJECT MATTER

The presently disclosed subject matter relates to moving platform navigation systems.

BACKGROUND

In various applications it is desired to determine an azimuth of a moving platform. One common technique of achieving this involves an inertial measurement unit (IMU) incorporated as part of an inertial navigation system (INS). A common IMU configuration includes one accelerometer and one gyro per each of the three platform axes: pitch, roll and yaw. The IMU detects linear acceleration in each axis using the accelerometers and rotation rate in each axis using the gyroscopes. Some IMUs also include magnetometers (likewise, one per each axis) which are used for determining a magnetic field in each axis. The INS utilizes the raw IMU measurements to calculate navigation data including for example, position, velocity and attitude (including azimuth) relative to a reference frame (coordinate system).

GENERAL DESCRIPTION

Azimuth of a platform can be determined on the ground (herein "pre-flight") before launch/takeoff or during flight (herein "in-flight"). For pre-flight azimuth determination, gyrocompassing can be used as known in the art. After completion of the gyrocompassing process, the IMU onboard the platform is aligned with a navigation reference frame related to Earth. For in-flight azimuth determination, an onboard GNSS (e.g. GPS) receiver can be used.

However, in some cases, for various reasons both gyrocompassing and GNSS are unavailable, or their use is undesirable. For example, the use of gyrocompassing as well as GNSS may be avoided in order to reduce costs. Specifically, gyrocompassing is a process that requires an accurate and therefore costly IMU. Furthermore, in some cases GNSS signals may not be available due to signal jamming or signal interference.

Using other azimuth determination techniques which employ devices external to the platform (e.g. transfer alignment) may also be undesirable as such techniques may introduce various errors during the azimuth determination process, which may be hard to track and/or costly.

Further azimuth determination techniques involve using magnetometers. Magnetometers are sensitive to various distortions, which deflect their measurements, causing them to be unreliable. Some distortions result from ground environmental influences which include for example, magnetic fields existing at the launching area, including those created by the launching device. These types of distortions may prevent using a magnetometer for determining azimuth on the ground.

According to the presently disclosed subject it is assumed that initial alignment (alignment between IMU reference frame and navigation reference frame) is not performed. Accordingly a respective transformation matrix between IMU frame and navigation frame is thus not available. Thus, azimuth of the platform cannot be determined by directly transforming IMU measurements to navigation reference frame.

The presently disclosed subject matter includes a method and system directed for calculating azimuth of an airborne platform during flight based on IMU measurements, without using GNSS data, gyrocompassing or magnetometers operating on the ground for determining the azimuth.

Furthermore, according to the presently disclosed subject matter the azimuth of the platform can be determined in case the IMU is aligned with respect to the platform as well as in case the IMU is not mount-aligned with respect to the platform.

According to an aspect of the presently disclosed subject matter there is provided a computer implemented method of in-flight determination of azimuth of an aerial platform, the platform comprising an IMU operatively connected to at least one computer device, the method comprising:

defining an auxiliary frame (coordinate system) comprising an axis $X_{AF}$ being a projection of an IMU sensor frame axis on a plane defined by two of a navigation frame axes, wherein $\Psi_s$ is an angle on the plane, between the projection $X_{AF}$ and a predefined direction on the plane;

obtaining data indicative of Earth's magnetic field at the flight area of the aerial platform;

using the at least one computer device for calculating flight direction of a platform in the IMU sensor frame based on IMU acceleration measurements;

during an in-flight phase:

using IMU magnetometers for obtaining magnetic field measurements in sensor frame and using the at least one computer device for calculating magnetic field values in the auxiliary reference frame based on the magnetic field values in sensor frame;

using the at least one computer device for calculating angle $\Psi_s$ based on magnetic field measurements in the auxiliary reference frame and Earth's magnetic field in the flight area, and thereby obtaining a transformation matrix from sensor frame to navigation frame $C_{SF}^{NF}$; and using the at least one computer device for calculating azimuth of the platform based on the flight direction in IMU sensor frame, IMU in-flight gyro measurements and the transformation matrix $C_{SF}^{NF}$.

In addition to the above features, the method according to this aspect of the presently disclosed subject matter can optionally comprise one or more of features (i) to (xiii) below, in any technically possible combination or permutation:

i. wherein the navigation frame is a local reference frame with respect to Earth and the plane is a horizontal plane.

ii. wherein the predefined direction is north direction.

iii. wherein the navigation frame is North-East-Down.

iv. the computer implemented method further comprising storing Earth MF in a data-storage onboard the platform.

v. wherein the sensor frame is not aligned with the platform frame, and the platform is positioned in a substantially vertical orientation, the method further comprising, using IMU accelerometers while on the ground for determining flight direction in the sensor frame based on gravitational vector.

vi. wherein the IMU frame is not aligned with the platform frame, and the platform is positioned in a non-vertical orientation, the method further comprising,
using IMU accelerometers immediately after launch for determining flight direction in the sensor frame based on acceleration measurements vector.

vii. wherein the sensor frame is not aligned with the platform frame, the method further comprising:
using IMU accelerometers while on the ground for determining flight direction in the sensor frame based on gravitational vector; and using IMU accelerometers immediately after launch for determining flight direction in the sensor frame based on the acceleration measurements vector.

viii. wherein calculating magnetic field values in the auxiliary reference frame further comprises:

transforming measured magnetic field values in the sensor frame to the initial sensor frame; and transforming measured magnetic field values in the initial sensor frame to the auxiliary reference frame.

ix. wherein for rectifying distortions in in-flight magnetic field measurements, the method further comprises:

using IMU magnetometers for performing multiple in-flight magnetic field measurements at different times; generating equations, each equation is based on a respective magnetic field measurement, wherein the minimal number of equations is dependent on the number of distortions which are being rectified; and solving the plurality of equations for calculating angle $\Psi_s$.

x. The method further comprising:

comparing between IMU orientations at the time of different magnetic field measurements; and confirming that there are sufficient in-flight magnetic field measurements, each taken while IMU assumes a different orientation.

xi. wherein distortions include one or more of: bias, scale factor, hard iron distortions; and soft iron distortions.

xii. the method further comprising controlling flight of the platform based on the calculated azimuth.

xiii. the method further comprising, controlling flight of the platform based on the calculated azimuth for the purpose of maintaining the platform within a predetermined flight area.

According to another aspect of the presently disclosed subject matter there is provided a navigation system mountable on an aerial platform and configured for in-flight determination of an azimuth of the platform, the navigation system comprising an IMU fixed to the platform and being operatively connected to at least one computer device comprising at least one processor, the navigation system being configured to:

utilize the at least one computer device to define an auxiliary frame (coordinate system) comprising an axis $X_{AF}$ being a projection of an IMU sensor frame axis on a plane defined by two of a navigation frame axes, wherein q, is an angle on the plane, between the projection $X_{AF}$ and a predefined direction on the plane;

obtain data indicative of Earth's magnetic field at the flight area of the aerial platform;

utilize IMU accelerometer to measure IMU acceleration and utilize the at least one computer device to calculate flight direction of platform in IMU sensor frame based on the IMU acceleration measurements;

during an in-flight phase:

utilize IMU magnetometers for obtaining magnetic field measurements in the sensor frame and utilize the at least one computer device to calculate magnetic field values in the auxiliary reference frame based on the magnetic field values in the sensor frame;

utilize the at least one computer device to calculate angle $\Psi_s$ based on magnetic field measurements in the auxiliary reference frame and the Earth's magnetic field in the flight area, and thereby obtain a transformation matrix from the sensor frame to navigation frame $C_{SF}^{NF}$; and utilize the at least one computer device to calculate azimuth of the platform based on the flight direction in IMU sensor frame, IMU in-flight gyro measurements and the transformation matrix $C_{SF}^{NF}$.

According to another aspect of the presently disclosed subject matter there is provided a non-transitory program storage device readable by a computer, tangibly embodying a program of instructions executable by the computer to perform a method of in-fight determination of an azimuth of an aerial platform, the platform comprising an IMU operatively connected to at least one computer device; the method comprising:

defining an auxiliary frame (coordinate system) comprising an axis $X_{AF}$ being a projection of an IMU sensor frame axis on a plane defined by two of a navigation frame axes, wherein $\Psi_s$ is an angle on the plane, between the projection $X_{AF}$ and a predefined direction on the plane;

obtaining data indicative of Earth's magnetic field at the flight area of the aerial platform; calculating flight direction of platform in IMU sensor frame based on IMU acceleration measurements;

during an in-flight phase:

obtaining from IMU magnetometers for magnetic field measurements in the sensor frame and calculating magnetic field values in the auxiliary reference frame based on the magnetic field values in the sensor frame;

calculating angle $\Psi_s$ based on magnetic field measurements in the auxiliary reference frame and Earth's magnetic field in the flight area, and thereby obtaining a transformation matrix from the sensor frame to navigation frame $C_{SF}^{NF}$; and calculating azimuth of the platform based on the flight direction in the IMU sensor frame, IMU in-flight gyro measurements and the transformation matrix $C_{SF}^{NF}$.

According to another aspect of the presently disclosed subject matter there is provided a platform comprising a navigation system as described above.

The system, the program storage device, and the platform disclosed herein according to various aspects, can optionally further comprise one or more of features (i) to (xiii) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the drawings and descriptions set forth, identical reference numerals indicate those components that are common to different embodiments or configurations. Components in the drawings are not necessarily drawn to scale.

Unless specifically stated otherwise, as apparent from the following discussions, it is appreciated that throughout the specification discussions utilizing terms such as "defining", "obtaining", "calculating", "transforming", "determining" or the like, include action and/or processes of a computer that manipulate and/or transform data into other data, said data represented as physical quantities, e.g. such as electronic quantities, and/or said data representing the physical objects.

The terms "computer", "computer device", "control unit", or the like as disclosed herein should be broadly construed to include any kind of electronic device with data processing circuitry, which includes a computer processing device configured and operable to execute computer instructions stored, for example, on a computer memory being operatively connected thereto. Examples of such a device include: a digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 3:
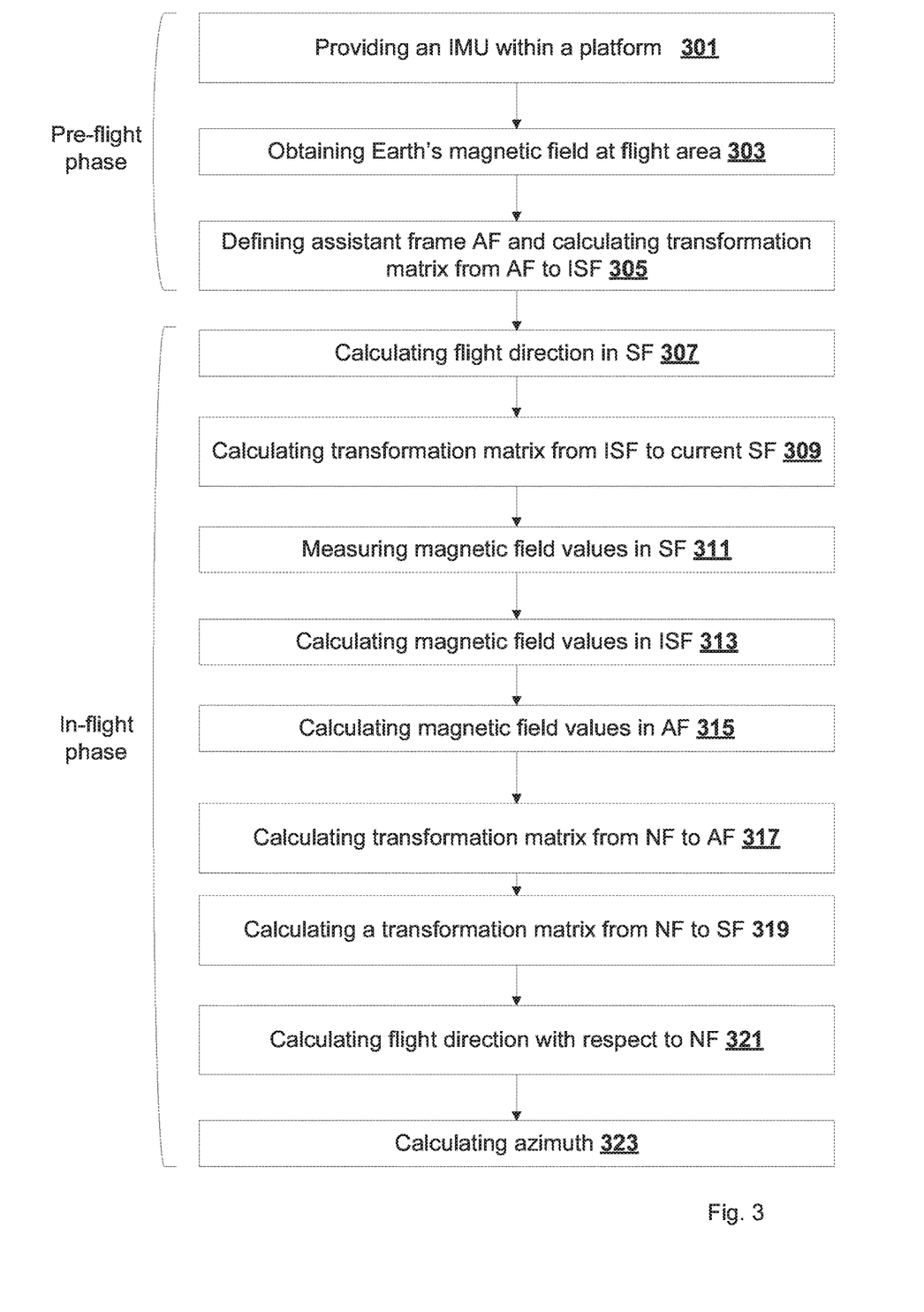
FIG. 3 is a flowchart illustrating operations carried out for calculating platform flight azimuth in accordance with some examples of the presently disclosed subject matter.
Figure 4:
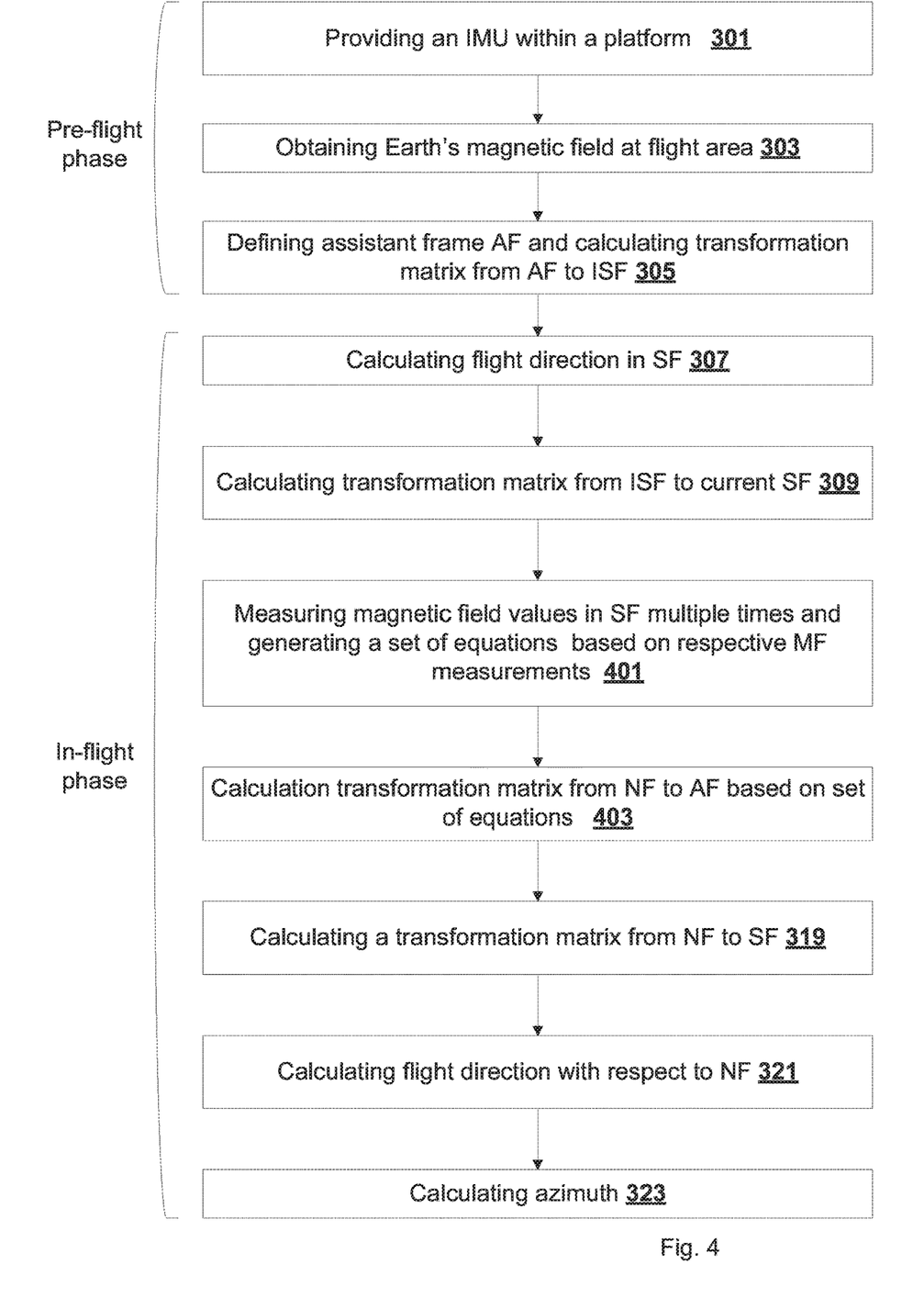
FIG. 4 is a flowchart illustrating operations carried out for calculating platform flight azimuth, assuming distortions in magnetic field measurements cannot be neglected, in accordance with an example of the presently disclosed subject matter.

In embodiments of the presently disclosed subject matter, fewer, more and/or different stages than those shown in FIGS. 3 and 4 may be executed. In embodiments of the presently disclosed subject matter, one or more stages illustrated in FIGS. 3 and 4 may be executed in a different order and/or one or more groups of stages may be executed simultaneously. For example, operations described with reference to blocks 305 and 309 in FIG. 3 can be combined into a combined output (one transformation matrix) and the resulting output can be used in the calculation of block 315, i.e. multiplying the resulting matrix by the measured magnetic field vector.

Figure 1:
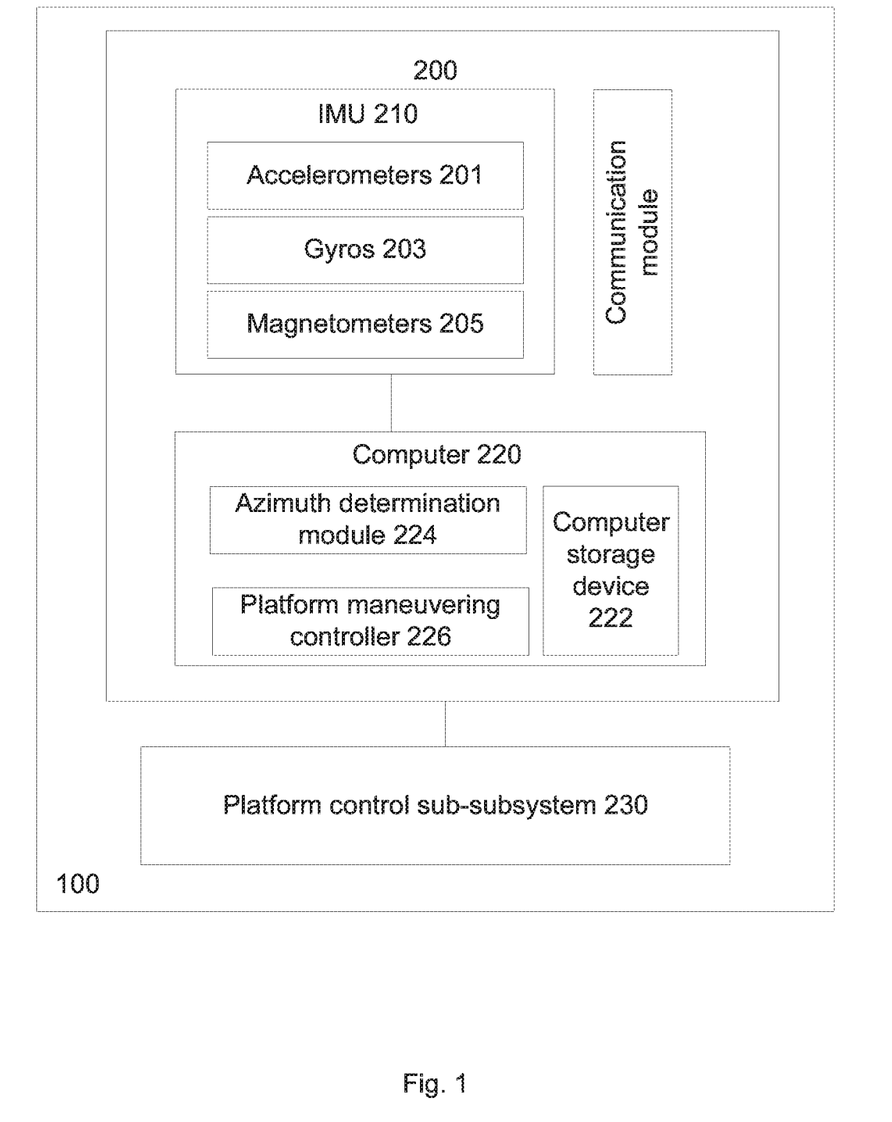
FIG. 1 is a block diagram schematically illustrating a system, in accordance with some examples of the presently disclosed subject matter.

FIG. 1 illustrates a general schematic of the functional layout of the system architecture in accordance with examples of the presently disclosed subject matter. Components in FIG. 1 can be made up of any combination of software and hardware and/or firmware that performs the functions as defined and explained herein. Components in FIG. 1 can be in some examples centralized in one location and in other examples dispersed over more than one location. In other examples of the presently disclosed subject matter, the system may comprise fewer, more, and/or different components than those shown in FIG. 1. For example, while FIG. 1 shows a single computer device, platform (body) 100 as well as system 200 specifically, can include a plurality of computers (which can be at least partly interconnected), each dedicated for executing certain operations.

The terms "IMU frame", "IMU sensor frame" and "sensor frame" are used herein interchangeably.

The term "navigation reference frame" is used herein to include any frame of reference with respect to Earth (e.g. ECEF). For simplicity, in the following description it is suggested to use a local reference frame with respect to Earth, such as North-East-Down (NED) or North-West-Up (NWU), however this should not be construed as limiting, as transformation from one reference frame to another reference frame is possible, as is well known in the art. It is noted that any reference made to NED in the following description is done by way of example only and should not be construed as limiting.

It is noted that any assignment of directions in a coordinate system to X, Y and Z axis is arbitrary and an alternative assignment of the axes can be likewise implemented. E.g. where a first direction is assigned as Y axis instead of X axis, a second direction is assigned as Z axis instead of Y axis and a third direction is assigned as X axis instead of Z axis.

Attention is now drawn to FIG. 1 showing a block diagram schematically illustrating a platform comprising a navigation system, in accordance with some examples of the presently disclosed subject matter. Platform 100 schematically represents various types of airborne vehicles which are capable of being directed to fly in a certain direction, e.g. towards a target. Platform 100 can be for example, a missile, a rocket, some other projectile or an aircraft (e.g. unmanned aerial vehicle).

Platform 100 comprises navigation system 200 configured and operable in general to determine navigation data, the navigation data including azimuth of the platform. According to some examples of the presently disclosed subject matter the navigation system 200 comprises IMU 210, which comprises in turn IMU subcomponents including: accelerometers 201, gyros 203 and magnetometers 205. Each of these IMU subcomponents can be a triple-axis (three-dimensional) device having three respective components, one for each axis, to provide a 9 degree of freedom IMU device.

In those cases where IMU is mount-aligned with the platform (i.e. IMU attitude with respect to a carrying platform is known) IMU measurements can be transformed to the platform frame (based on a suitable transformation matrix as known in the art).

According to some examples of the presently disclosed subject matter, IMU 210 is fixed to platform 100 (e.g. installed inside the platform) without mount-aligning the IMU relative to the platform (referred to herein as "non-aligned IMU"). According to other examples, IMU 210 is mount-aligned with respect to the platform.

In some cases it may be desired to refrain from executing a mount-alignment process for determining transformation between the IMU frame and the platform frame. This allows in some cases to use a less accurate IMU (which otherwise may have been required for the mount-alignment process) and a much simpler and cheaper installation process of the IMU device in the platform. In addition, some IMU mount-alignment methods involve the use of external alignment devices. Using such devices may introduce, during the alignment process various misalignment errors, which may be hard to track. Therefore, It may be desired to refrain from IMU alignment using external alignment devices, in order to avoid such potential errors.

Navigation system 200 can comprise or be otherwise operatively connected to one or more (two, three, four, etc.) computer processing devices 220 comprising a processing circuitry configured and operable to calculate navigation data from received IMU data input. Specifically, according to the presently disclosed subject matter, computer processing device 220 is configured and operable to determine a flight azimuth of platform 100 based on measurements received from IMU 210, where the IMU can be either mount-aligned or non-aligned.

Computer processing device 220 can comprise for example azimuth determination module 224 configured and operable for calculating azimuth of platform 100 based on IMU measurements. According to some examples computer processing device 220 can further comprise or be otherwise operatively connected to platform maneuvering controller 226 configured and operable to generate maneuvering instructions directed for controlling the heading of the platform to maintain its course in a desired direction based on the calculated azimuth. Instructions generated by platform maneuvering controller 226 can be provided to one or more platform control sub-systems 230 (including for example a tail rudder or other movable platforms) configured and operable, responsive to the instructions, to maneuver the platform to a desired direction.

It is noted that FIG. 1 is functional block diagram showing only functional components which are relevant to the presently disclosed subject matter. In reality, platform 100 comprises many other components related to other functionalities of the platforms (e.g. structural system, power source, various sensors, etc.) which are not described for the sake of simplicity and brevity.

FIG. 3 is a flowchart illustrating operations related to a flight azimuth calculation process, in accordance with an example of the presently disclosed subject matter. Operations described with reference to FIG. 3 (as well as FIG. 4 below) can be executed, for example, with the help of system 200 described above with reference to FIG. 1. Specifically, calculations made as part of the flow in FIG. 3 (and FIG. 4) can be executed for example by computer processing device 220 (e.g. by azimuth determination module 224). It is noted however that any description of operations which is made with reference to at least some of the components in FIG. 1, is done by way of example and for the purpose of illustration only and should not be construed as limiting in any way.

At block 301 an IMU (including 9 DOF sensors) is provided on an aerial platform at a fixed attitude with respect to the platform. This operation can be carried out for example at the factory at the time of manufacturing, where during installation or configuration of the platform, an IMU is mounted on the platform (e.g. firmly installed within the platform or otherwise attached thereto). As mentioned above, according to the presently disclosed subject matter transformation matrix from IMU reference frame (herein below "sensor frame", abbreviated "SF") to navigation reference frame (abbreviated "NF") is not known at this stage.

At block 303 magnetic field values (in 3-axis) relative to the NF ($MF_{NF}$; herein below also "Earth MF"), at the flight area are obtained. As is well-known in the art, a magnetic field at a certain location on Earth can be obtained based on measurements or based on well-known models. Thus, given a flight area the respective magnetic field at that location on Earth can be obtained. Notably, the $MF_{NF}$ which is used is selected according to the expected flight area, and it can be assumed that Earth's magnetic field does not significantly change during flight.

According to one example, this information can be made accessible to computer processing device 220 designated to operate at a certain area on Earth. $MF_{NF}$ data can be stored for example within computer memory 222. According to another example, this information can be provided to system 200 at some time after manufacturing, e.g. before launch at a designated location on Earth. In some examples, system 200 can further comprise a communication module of some sort configured and operable to communicate with an external information resource which provides the magnetic field values.

In the following, azimuth of the platform is determined during flight. The azimuth is calculated based on a projection of one axis of initial sensor frame ("ISF", i.e. IMU-sensor frame before launch) on a plane P and calculation of an angle $\Psi_s$ between the projection and a predefined direction on the plane. According to one example, plane P is a horizontal plane at the launch site and the predefined direction is north direction, however this should not be construed as limiting.

Figure 2:
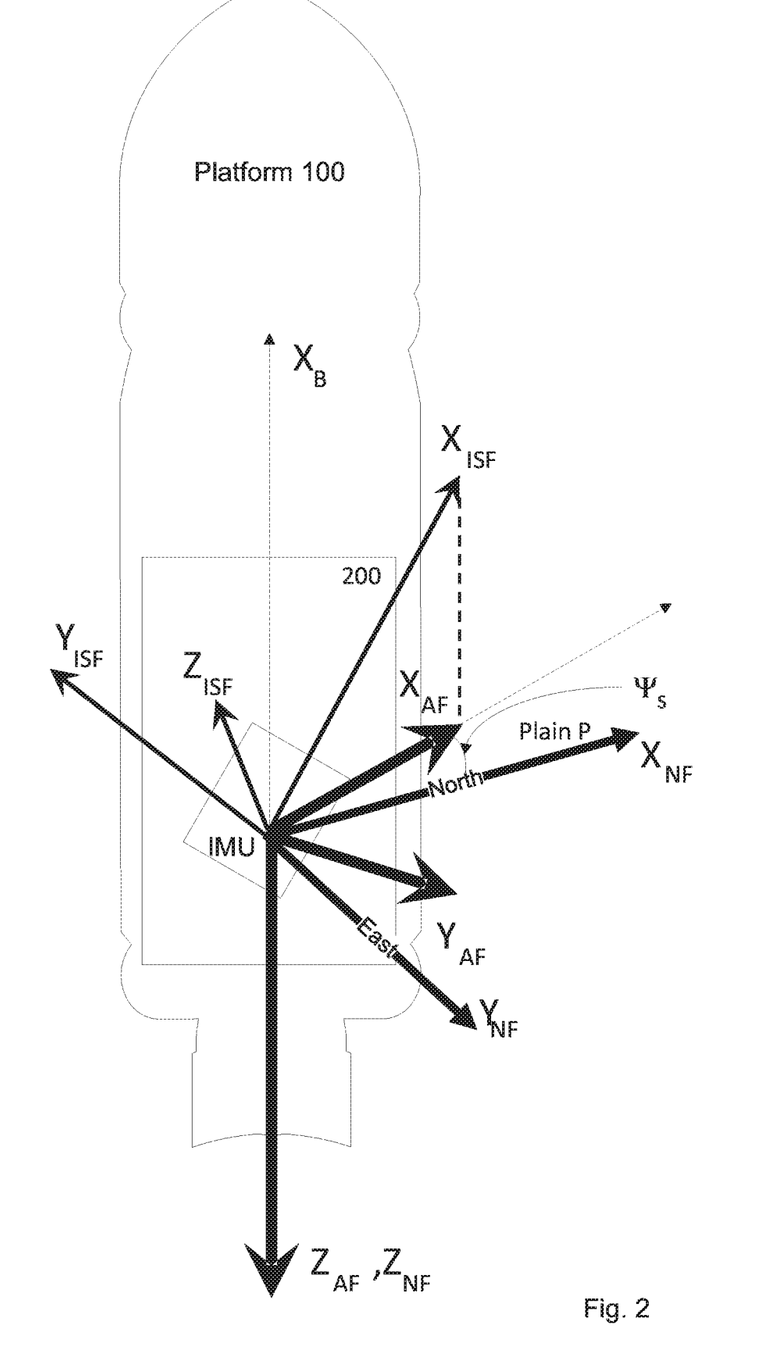
FIG. 2 is a schematic illustration of a platform comprising a navigation system, in accordance with some examples of the presently disclosed subject matter.

According to some examples of the presently disclosed subject matter, a reference frame is defined (referred to herein below as "auxiliary frame" and abbreviated "AF"). Auxiliary frame is explained with reference to FIG. 2, which shows a schematic illustration of an IMU within a platform positioned before launch. IMU frame is indicated by axes $X_{SF}$, $Y_{SF}$, and $Z_{SF}$. Auxiliary frame is indicated by axes $X_{AF}$, $Y_{AF}$ and $Z_{AF}$. Note that $X_{AF}$ axis of the auxiliary frame represents a projection of $X_{ISF}$ (X of ISF) on a horizontal plane of NF. In the current examples NF is North-East-Down (NED), where horizontal plane is X, Y plane in NED. As the leveling angles can be determined, the transformation matrix from AF to NF includes only a single unknown variable, i.e. angle $\Psi_s$, angle between the $X_{AF}$ and $X_{NF}$ (in the current example north direction). Notably, Z axis direction in auxiliary frame ($Z_{AF}$) coincides with apparent gravitation direction indicated by axis Z in navigation frame, NED ($Z_{NF}$).

A transformation matrix between the auxiliary frame and the initial sensor frame (ISF) is determined based on acceleration measurements (by IMU 210) taken before launch and gravitation (block 305). Transformation matrix from ISF to AF is determined and the transpose matrix from AF to ISF is determined as well. Notably, as the operation of determining a transpose matrix is a well-known mathematical operation, in the following description any calculation of a matrix assumes that the transpose matrix is available as well. Examples of calculation of transformation matrix from AF to ISF are provided below.

$$C_{AF}^{ISF} = \begin{bmatrix} 1 & 0 & 0 \\ 0 & \cos(\varphi) & \sin(\varphi) \\ 0 & -\sin(\varphi) & \cos(\varphi) \end{bmatrix} \begin{bmatrix} \cos(\vartheta) & 0 & -\sin(\vartheta) \\ 0 & 1 & 0 \\ \sin(\vartheta) & 0 & \cos(\vartheta) \end{bmatrix} \quad \text{Equation 1.1}$$

Wherein $\varphi$, $\vartheta$—roll and pitch Euler angles in accordance with aircraft Euler angles order convention, and can be calculated as follows:

Equation 1.2 and 1.3:

$$g \cdot \sin(\vartheta) = a_X$$

$$g \cdot \cos(\vartheta) \cdot \sin(\varphi) = -a_Y$$

Where:

$a_X$, $a_Y$, $a_Z$—accelerometers measurements in SF

Apparent gravitation value g can be calculated by equation 1.4:

$$g=\sqrt{a_X^2+a_Y^2+a_Z^2}$$

Alternatively, g can be stored and obtained from computer memory 222.

At block 307 flight direction with respect to SF is calculated. Notably, in FIGS. 3 and 4 operation 307 is associated with the in-flight phase (assuming non-vertical orientation). However, as shown below in some examples where platform assumes vertical orientation, this operation can be executed during the pre-flight phase.

Platform flight direction in IMU frame can be determined based on IMU acceleration measurements provided by accelerometers 201. Notably, it is generally assumed that the platform (e.g. missile) advances such that the platforms nose and the flight direction sufficiently coincide (in the requested accuracy). In case the platform is positioned in a substantially vertical orientation, flight direction with respect to SF can be calculated before flight and can be expressed by:

Equation 2.1, flight direction unit vector in SF:

$$\vec{u} = \begin{bmatrix} \frac{a_X}{g} & \frac{a_Y}{g} & \frac{a_Z}{g} \end{bmatrix}^T$$

Note equation 1.4 above where: $g=\sqrt{a_x^2+a_y^2+a_z^2}$

In case the platform is positioned in a non-vertical orientation, this can be performed at the initial stage of flight immediately after launch (e.g. less than several seconds) and can be expressed by:

Equation 2.2 flight direction unit vector in SF:

$$\vec{u} = \begin{bmatrix} \frac{a_X(t)}{a(t)} & \frac{a_Y(t)}{a(t)} & \frac{a_Z(t)}{a(t)} \end{bmatrix}^T$$

Where t is time of measurement, and where $$a(t)=\sqrt{a_X(t)^2+a_y(t)^2+a_z(t)^2}$$

Notably, additional IMU measurements are performed in case of a non-vertical orientation.

According to some examples, information indicating whether or not the platform is placed in a vertical orientation before launch can be stored in computer memory 222 and used at the time of calculation.

In some examples, in the event that the platform is positioned in vertical orientation, both acceleration measurements before and after takeoff can be implemented, e.g. for the purpose of validating the determined flight direction and/or improving accuracy. It is noted that IMU acceleration measurements taken before launch or immediately after launch can be stored and the actual calculation can be made at later stages of the process before the calculation of flight direction with respect to NF is performed.

If the IMU is mount-aligned with the platform (body) i.e. $C_{Body}^{SF}$ is known, flight direction in sensor frame can be determined by:

Equation 2.3 flight direction unit vector in SF:

$$\vec{u} = C_{Body}^{SF} \begin{bmatrix} 1 \\ 0 \\ 0 \end{bmatrix}$$

Calculations according to equations 2.1 and 2.2 can also be implemented when IMU is mount-aligned, e.g. for the purpose of accuracy and/or confirmation.

While the platform is airborne, transformation matrix from ISF (SF before takeoff) to a current SF (SF at a time instant t during flight) is calculated (block 309). As known in the art, this can be accomplished based on IMU angular velocity measurements (measured by IMU gyros 203).

Further during flight, magnetic field in sensor frame ($MF_{SF}$) values at a time instant t are measured by magnetometers 205 (Block 311). These measurements are made at least once, and as explained further below, in some cases it is repeated multiple times during flight, at multiple time instances. Note that unlike the $MF_{NF}$ values at the flight area, which are provided in NF (see block 303 above), here the $MF_{SF}$ measurements are measured and provided in SF.

As mentioned above, magnetometers suffer from distortions which deflect their measurements. In addition to the distortions mentioned above resulting from ground environmental influences at the launching area, other distortions which influence magnetic field measurements are caused inside the platform (including hard iron distortion and soft iron distortion as known in the art). Furthermore, magnetometers may suffer from an internal error (e.g. sensors biases, scale factor errors, etc.).

Distortions resulting from environmental influences on the ground (e.g. at the launching area) are attenuated in magnetometers operating in a platform after launch while airborne. Furthermore, at least some of the other distortions can be estimated and/or attenuated in other ways. Therefore, the $MF_{SF}$ measurements obtained during flight can be rectified and then used as disclosed herein. The following process assumes negligible distortions in $MF_{SF}$ measurements. A variation of this process, which assumes distortions in $MF_{SF}$ measurements cannot be neglected is described below with reference to FIG. 4.

At block 313 the MF in ISF ($MF_{ISF}$) is calculated based on measured $MF_{SF}$ at time t. This can be accomplished based on the transformation matrix from current SF to ISF expressed by $C_{SF}^{ISF}$, which has been determined earlier (see block 309), and its multiplication by the measured $MF_{SF}$ at time t (matrix vector multiplication). It is noted that the calculation of transformation matrix from current SF to ISF is performed repeatedly (e.g. at time t when magnetic field $MF_{SF}$ values are measured) and used during the calculation of MF in ISF.

Calculation of magnetic field values in ISF can be expressed by equation 3:

$$\begin{bmatrix} h_X^{ISF}(t) \\ h_Y^{ISF}(t) \\ h_Z^{ISF}(t) \end{bmatrix} = C_{SF}^{ISF} \begin{bmatrix} h_X^{SF}(t) \\ h_Y^{SF}(t) \\ h_Z^{SF}(t) \end{bmatrix}$$

Wherein:

$h_X^{SF}(t)$, $h_Y^{SF}(t)$, $h_Z^{SF}(t)$—magnetic field measurements ($MF_{SF}$); and $h_X^{SF}(t)$, $h_Y^{ISF}(t)$, $h_Z^{ISF}(t)$—magnetic field values ($MF_{ISF}$).

At block 315 $MF_{AF}$ at time t in auxiliary frame AF are calculated based on calculated $MF_{ISF}$ values at time t in ISF and the transformation matrix from ISF to AF determined earlier (see block 305).

Calculating of magnetic field values in AF can be expressed by equation 4:

$$\begin{bmatrix} h_X^{AF}(t) \\ h_Y^{AF}(t) \\ h_Z^{AF}(t) \end{bmatrix} = C_{ISF}^{AF} \begin{bmatrix} h_X^{ISF}(t) \\ h_Y^{ISF}(t) \\ h_Z^{ISF}(t) \end{bmatrix}$$

Where $h_X^{AF}(t)$, $h_Y^{AF}(t)$, $h_Z^{AF}(t)$—magnetic field values ($MF_{AF}$).

At block 317 a transformation matrix from NF to AF is calculated based on MF in AF (known from previous operation 315) and MF in NF obtained earlier (see block 303). As mentioned above, the transformation matrix from AF to NF includes a single unknown variable, i.e. angle $\Psi_s$.

Expression of transformation matrix from NF to AF can be expressed by:

$e_X^{NF}$, $e_Y^{NF}$, $e_Z^{NF}$—obtained Earth magnetic field values ($MF_{NF}$).

$$C_{NF}^{AF} = \begin{bmatrix} \cos(\psi_s) & \sin(\psi_s) & 0 \\ -\sin(\psi_s) & \cos(\psi_s) & 0 \\ 0 & 0 & 1 \end{bmatrix} \qquad \text{Equation 5.1}$$

$$\begin{bmatrix} h_X^{AF}(t) \\ h_Y^{AF}(t) \\ h_Z^{AF}(t) \end{bmatrix} = C_{NF}^{AF} \begin{bmatrix} e_X^{NF} \\ e_Y^{NF} \\ e_Z^{NF} \end{bmatrix} \qquad \text{Equation 5.2}$$

$$\begin{bmatrix} h_X^{AF}(t) \\ h_Y^{AF}(t) \\ h_Z^{AF}(t) \end{bmatrix} = \begin{bmatrix} \cos(\psi_s) & \sin(\psi_s) & 0 \\ -\sin(\psi_s) & \cos(\psi_s) & 0 \\ 0 & 0 & 1 \end{bmatrix} \begin{bmatrix} e_X^{NF} \\ e_Y^{NF} \\ e_Z^{NF} \end{bmatrix} \qquad \text{Equation 5.3}$$

$\Psi_s$ can be now calculated.

At block 319 the transformation matrix from NF to SF is calculated based on the output obtained from operation described above with reference to 305, 309, 317.

Calculation of a transformation matrix from NF to SF is expressed by equation 6:

$$C_{NF}^{SF} = C_{ISF}^{SF} C_{AF}^{ISF} C_{NF}^{AF}$$

Once the transformation matrix from NF to SF is known, flight direction with respect to NF is calculated (block 321). This can be accomplished by transforming the calculated flight direction in SF, to NF using transformation matrix calculated in 319.

Calculation of flight direction with respect to NF is expressed by equation 7:

$$\begin{bmatrix} u_N \\ u_E \\ u_D \end{bmatrix} = C_{SF}^{NF} \begin{bmatrix} u_x \\ u_y \\ u_u \end{bmatrix}$$

At block 323 azimuth of platform is calculated based on flight direction in NF, which can be calculated for example by equation 8:

$$\text{Azimuth} = \text{atan}^2(u_E, u_N)$$

In some examples, the calculated azimuth can be used for generating maneuvering instructions for controlling the platform and directing its flight in a desired direction (e.g. by platform maneuvering controller 226 providing instructions to platform control sub-system 230). In other examples, the platform can be destroyed or diverted in case the azimuth indicates deflection of the platform from an allowed flight area e.g. for safety reasons.

As mentioned above various distortions of magnetic field measurements can be estimated in order to reduce their negative effect on the calculated result.

Because the magnetic field measurements may be not accurate (i.e. suffer from different errors such as: biases, scale factors, hard and soft iron distortions as was mentioned above) a plurality of magnetic field measurements can be used at different times to generate a plurality of equations which can be solved to enable rectification of errors.

FIG. 4 is a flowchart illustrating operations carried out for calculating platform flight azimuth assuming distortions in $MF_{SF}$ measurements cannot be neglected, in accordance with an example of the presently disclosed subject matter. Notably, the following is an example aiming to rectify some of the possible distortions. Additional measurements can be used for likewise rectifying additional distortions.

Operations mentioned with respect to blocks 301, 303, 305, 307, 309 in FIG. 4 are executed in the same manner as described above with reference to FIG. 3.

At block 401 magnetic field ($MF_{SF}$) values are measured at multiple time instances to obtain multiple $MF_{SF}$ measurements and corresponding equations are generated for a respective measurement.

According to some examples, multiple $MF_{SF}$ measurements are stored in computer memory 222. When the number of measurements is sufficient for the azimuth calculation, the measured $MF_{SF}$ values stored in the computer memory are used for calculating the azimuth. In some examples, the orientations during different $MF_{SF}$ measurements are compared (e.g. based on transformation matrix $C_{ISF}^{SF}$) in order to confirm that there are sufficient $MF_{SF}$ measurements taken at different orientations to provide the needed independent equations for calculation.

The following is one non-limiting example of a calculation of W, while taking into consideration various magnetic field errors (distortions).

Magnetic field measurements in $MF_{SF}$ before rectification of errors:

$$h_{X_{Meas}}^{SF}(t), h_{Y_{Meas}}^{SF}(t), h_{Z_{Meas}}^{SF}(t)$$

Actual magnetic field in sensor frame (i.e. real magnetic field inside body):

$$h_{X_{Act}}^{SF}(t), h_{Y_{Act}}^{SF}(t), h_{Z_{Act}}^{SF}(t)$$

Earth magnetic field values outside of platform (i.e. without influence of errors induced inside body) in sensor frame is expressed by:

$$h_{X_{Earth}}^{SF}(t), h_{Y_{Earth}}^{SF}(t), h_{Z_{Earth}}^{SF}(t)$$

Magnetometers biases:
$b_X$, $b_Y$, $b_Z$
Magnetometers scale factors:
$k_{S_X}$, $k_{S_Y}$, $k_{S_Z}$
Platform magnetic field attenuation factors:
$k_{B_X}$, $k_{B_Y}$, $k_{B_Z}$
Platform magnetic field:
$d_X$, $d_Y$, $d_Z$ Equation 9.1 shows a relation between actual magnetic field inside platform (body) in sensor frame and measured magnetic field in sensor frame:

$$\begin{bmatrix} h^{SF}_{X_{Meas}}(t) \\ h^{SF}_{Y_{Meas}}(t) \\ h^{SF}_{Z_{Meas}}(t) \end{bmatrix} = \begin{bmatrix} k_{S_X} & 0 & 0 \\ 0 & k_{S_Y} & 0 \\ 0 & 0 & k_{S_Z} \end{bmatrix} \begin{bmatrix} h^{SF}_{X_{Act}}(t) \\ h^{SF}_{Y_{Act}}(t) \\ h^{SF}_{Z_{Act}}(t) \end{bmatrix} + \begin{bmatrix} b_X \\ b_Y \\ b_Z \end{bmatrix}$$

Influence of biases $b_X$, $b_Y$, $b_Z$ and scale factors $k_{S_X}$, $k_{S_Y}$, $k_{S_Z}$, which are internally induced, are considered in equation 9.1.

Equation 9.2 shows a relation between actual magnetic field inside platform (body) in sensor frame and magnetic field outside platform is sensor frame:

$$\begin{bmatrix} h^{SF}_{X_{Act}}(t) \\ h^{SF}_{Y_{Act}}(t) \\ h^{SF}_{Z_{Act}}(t) \end{bmatrix} = \begin{bmatrix} k_{B_X} & 0 & 0 \\ 0 & k_{B_Y} & 0 \\ 0 & 0 & k_{B_Z} \end{bmatrix} \begin{bmatrix} h^{SF}_{X_{Earth}}(t) \\ h^{SF}_{Y_{Earth}}(t) \\ h^{SF}_{Z_{Earth}}(t) \end{bmatrix} + \begin{bmatrix} d_X \\ d_Y \\ d_Z \end{bmatrix}$$

Influence of attenuation by body $k_{B_X}$, $k_{B_Y}$, $k_{B_Z}$ and constant magnetic field $d_X$, $d_Y$, $d_Z$, which are internally induced (inside body) are considered in equation 9.2.

Based on equations 9.1 and 9.2, equation 9.3 shows a relation between a measured magnetic field in sensor frame and Earth's magnetic field in sensor frame:

$$\begin{bmatrix} h^{SF}_{X_{Meas}}(t) \\ h^{SF}_{Y_{Meas}}(t) \\ h^{SF}_{Z_{Meas}}(t) \end{bmatrix} = \begin{bmatrix} k_{S_X} & 0 & 0 \\ 0 & k_{S_Y} & 0 \\ 0 & 0 & k_{S_Z} \end{bmatrix}$$

$$\left( \begin{bmatrix} k_{B_X} & 0 & 0 \\ 0 & k_{B_Y} & 0 \\ 0 & 0 & k_{B_Z} \end{bmatrix} \begin{bmatrix} h^{SF}_{X_{Earth}}(t) \\ h^{SF}_{Y_{Earth}}(t) \\ h^{SF}_{Z_{Earth}}(t) \end{bmatrix} + \begin{bmatrix} d_X \\ d_Y \\ d_Z \end{bmatrix} \right) + \begin{bmatrix} b_X \\ b_Y \\ b_Z \end{bmatrix}$$

Expression of actual magnetic field on the right side of equation 9.1 is replaced with actual magnetic field inside platform in equation 9.2

Designate:

$$\begin{bmatrix} k_X \\ k_Y \\ k_Z \end{bmatrix} = \begin{bmatrix} k_{B_X} \cdot k_{S_X} \\ k_{B_Y} \cdot k_{S_Y} \\ k_{B_Z} \cdot k_{S_Z} \end{bmatrix} \quad \begin{bmatrix} k_{d_X} \\ k_{d_Y} \\ k_{d_Z} \end{bmatrix} = \begin{bmatrix} k_{S_X} \cdot d_X \\ k_{S_Y} \cdot d_Y \\ k_{S_Z} \cdot d_Z \end{bmatrix} \quad \begin{bmatrix} kdb_X \\ kdb_Y \\ kdb_Z \end{bmatrix} = \begin{bmatrix} k_{d_X} \\ k_{d_Y} \\ k_{d_Z} \end{bmatrix} + \begin{bmatrix} b_X \\ b_Y \\ b_Z \end{bmatrix}$$

Rewriting equation 9.3 and generating equation 9.4:

$$\begin{bmatrix} h^{SF}_{X_{Meas}}(t) \\ h^{SF}_{Y_{Meas}}(t) \\ h^{SF}_{Z_{Meas}}(t) \end{bmatrix} = \begin{bmatrix} k_X & 0 & 0 \\ 0 & k_Y & 0 \\ 0 & 0 & k_Z \end{bmatrix} \begin{bmatrix} h^{SF}_{X_{Earth}}(t) \\ h^{SF}_{Y_{Earth}}(t) \\ h^{SF}_{Z_{Earth}}(t) \end{bmatrix} + \begin{bmatrix} kdb_X \\ kdb_Y \\ kdb_Z \end{bmatrix}$$

Designate:

$k1_X = 1/k_X$ $k1_Y = 1/k_Y$ $k1_Z = 1/k_Z$ $kdb1_X = kdb_X/k_X$ $ksb1_Y = ksb_Y/k_Y$ $kdb1_Z = kdb_Z/k_Z$ Rewriting equation 9.4 and generating equation 9.5:

$$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} = \begin{bmatrix} h^{SF}_{X_{Earth}}(t) \\ h^{SF}_{Y_{Earth}}(t) \\ h^{SF}_{Z_{Earth}}(t) \end{bmatrix} + \begin{bmatrix} kdb1_X \\ kdb1_Y \\ kdb1_Z \end{bmatrix}$$

Rewriting equation 9.5 with NF magnetic field $$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} = C^{SF}_{ISF} C^{ISF}_{AF} C^{AF}_{NF} \begin{bmatrix} e^{NF}_X \\ e^{NF}_Y \\ e^{NF}_Z \end{bmatrix} + \begin{bmatrix} kdb1_X \\ kdb1_Y \\ kdb1_Z \end{bmatrix}$$

As explained above with respect to equation 5.1:

$$C^{AF}_{NF} = \begin{bmatrix} \cos(\psi_s) & \sin(\psi_s) & 0 \\ -\sin(\psi_s) & \cos(\psi_s) & 0 \\ 0 & 0 & 1 \end{bmatrix}$$

and

Calculation of $C_{ISF}^{SF}$ is explained with reference to block 309

Calculation of $C_{AF}^{ISF}$ is explained with reference to block 305

Equation 5.1 is merged into equation 9.5 expressed by equation 9.6:

$$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} =$$

$$C^{SF}_{ISF} C^{ISF}_{AF} \begin{bmatrix} \cos(\psi_s) & \sin(\psi_s) & 0 \\ -\sin(\psi_s) & \cos(\psi_s) & 0 \\ 0 & 0 & 1 \end{bmatrix} \begin{bmatrix} e^{NF}_X \\ e^{NF}_Y \\ e^{NF}_Z \end{bmatrix} + \begin{bmatrix} kdb1_X \\ kdb1_Y \\ kdb1_Z \end{bmatrix}$$

Operations described above with respect to blocks 313 to 317 for $\psi_S$ calculation are expressed by equation 9.6.

The number of required $MF_{SF}$ measurements depends on the number of unknowns, which dictates a minimal number of equations of the type 9.6 which are needed. Notably, assuming a change in orientation is observed between measurements, each MF measurement can provide for three equations, each based on a respective sensor frame axis.

The process described above enables to determine the number of unknowns and accordingly to estimate the number of required $MF_{SF}$ measurements. In the current examples where there are 7 variables $k1_x$, $k1_y$, $k1_z$, $kdb1_x$, $kdb1_y$, $kdb1_z$, $\Psi_s$) at least three $MF_{SF}$ measurements are needed, each taken at a different sensor frame orientation. It is noted that increasing the number of measurements and the number of respective equations can improve the accuracy of calculations. Therefore, in some examples a redundancy of measurements and respective equations can be used.

At block 403 the set of equations is solved to determine W.

Once $\Psi_s$ is calculated, transformation matrix from NF to SF is determined as described above with reference to block 319 in FIG. 3, using Equation 6. Flight direction in NF and azimuth are calculated as described above with reference to blocks 321 and 323 to determine the flight azimuth.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer implemented method of in-flight determination of an azimuth of an aerial platform, the platform comprising an inertial measurement unit (IMU) operatively connected to at least one computer device; the computer implemented method comprising:
    obtaining data indicative of Earth magnetic field in navigation frame ($MF_{NF}$) at a flight area of the aerial platform;
    defining an auxiliary reference frame comprising an axis $X_{AF}$ being a projection of an initial IMU sensor frame axis on a plane defined by two of a navigation frame axes, wherein the plane is a horizontal plane, wherein $\Psi_s$ is an angle on the plane, between the projection $X_{AF}$ and a predefined direction on the plane;
    using the at least one computer device for calculating flight direction of the aerial platform in IMU sensor frame based on IMU acceleration measurements;
    during an in-flight phase:
    using IMU in-flight gyro measurements for determining transformation from initial sensor frame to current sensor frame;
    using IMU magnetometers for obtaining magnetic field measurements in sensor frame and using the at least one computer device for calculating magnetic field values in the auxiliary reference frame based on the magnetic field measurements in sensor frame;
    using the at least one computer device for calculating angle $\Psi_s$ based on magnetic field values in the auxiliary reference frame and Earth's magnetic field in the flight area, and thereby obtaining a transformation matrix from sensor frame to navigation frame $C_{SF}^{NF}$; and
    using the at least one computer device for calculating azimuth of the platform based on the flight direction in IMU sensor frame and the transformation matrix $C_{SF}^{NF}$.

2. The computer implemented method of claim 1, wherein the navigation frame is a local reference frame with respect to Earth.

3. The computer implemented method of claim 1, wherein the predefined direction is north direction.

4. The computer implemented method of claim 3, wherein the navigation frame is North-East-Down.

5. The computer implemented method of claim 1, wherein the sensor frame is not aligned with the platform frame, and the platform is positioned in a substantially vertical orientation; the method further comprising:
    using IMU accelerometers while on the ground for determining flight direction in sensor frame based on gravitation.

6. The computer implemented method of claim 1, wherein the IMU frame is not aligned with the platform frame, and the platform is positioned in a non-vertical orientation, the method further comprising, using IMU accelerometers immediately after launch for determining flight direction in sensor frame based on acceleration measurements vector; and using the flight direction in sensor frame for determining azimuth of the platform notwithstanding IMU frame not being aligned with the platform frame.

7. The computer implemented method of claim 1, wherein the sensor frame is not aligned with the platform frame, the method further comprising:
    using IMU accelerometers while on the ground for determining flight direction in sensor frame based on gravitational vector; and
    using IMU accelerometers immediately after launch for determining flight direction in sensor frame based on acceleration measurements vector; and using the flight direction in sensor frame for determining azimuth of the platform notwithstanding IMU frame not being aligned with the platform frame.

8. The computer implemented method of claim 1, wherein calculating magnetic field values in the auxiliary reference frame further comprises:
    transforming measured magnetic field values in sensor frame to initial sensor frame; and transforming magnetic field values in initial sensor frame to auxiliary reference frame.

9. The computer implemented method of claim 1, wherein for rectifying distortions in in-flight magnetic field measurements, the method further comprises:
    using the IMU magnetometers for performing multiple in-flight magnetic field measurements, each taken at a different time;
    generating equations, each equation is based on a respective in-flight magnetic field measurement and presents a relation between the respective in-flight magnetic field measurements, one or more distortions and the Earth's magnetic field; and solving the equations for calculating angle $\Psi_s$, while considering the one or more distortions.

10. The computer implemented method of claim 9, wherein each in-flight magnetic field measurement is taken while the IMU assumes a different orientation, and wherein a number of in-flight magnetic field measurements is based on a number of one or more distortions, to thereby provide sufficient independent equations needed for rectifying the one or more distortions.

11. The computer implemented method of claim 10, wherein distortions include one or more of: bias; scale factor; hard iron distortions; and soft iron distortions.

12. The computer implemented method of claim 1 further comprising controlling flight of the platform based on the calculated azimuth.

13. A navigation system mountable on an aerial platform and configured for in-flight determination of an azimuth of the aerial platform, the navigation system comprising an inertial measurement unit (IMU) fixed to the platform and being operatively connected to at least one computer device comprising at least one processor, the navigation system is configured to:
- obtain data indicative of Earth magnetic field in navigation frame at a flight area of the aerial platform;
- utilize the at least one computer device to define an auxiliary reference frame comprising an axis $X_{AF}$ being a projection of an initial IMU sensor frame axis on a plane defined by two of a navigation frame axes, wherein the plane is a horizontal plane, wherein $\Psi_s$ is an angle on the plane, between the projection $X_{AF}$ and a predefined direction on the plane;
- utilize the at least one computer device for calculating flight direction of the aerial platform in IMU sensor frame based on IMU acceleration measurements;
- during an in-flight phase:
- utilize IMU gyros for obtaining in-flight gyro measurements and determining transformation from initial sensor frame to current sensor frame based on the in-flight gyro measurements;
- utilize IMU magnetometers for obtaining magnetic field measurements in sensor frame and utilize the at least one computer device to calculate magnetic field values in the auxiliary reference frame based on the magnetic field values in sensor frame;
- utilize the at least one computer device to calculate angle $\Psi_s$ based on magnetic field measurements in the auxiliary reference frame and Earth's magnetic field in the flight area, and thereby obtain a transformation matrix from sensor frame to navigation frame $C_{SF}^{NF}$; and
- utilize the at least one computer device to calculate azimuth of the platform based on the flight direction in IMU sensor frame and the transformation matrix $C_{SF}^{NF}$.

14. The navigation system of claim 13, wherein the navigation frame is a local reference frame with respect to Earth.

15. The navigation system of claim 13, wherein the predefined direction is north direction and the navigation frame is North-East-Down.

16. The navigation system of claim 13, wherein the sensor frame is not aligned with the platform frame, and the platform is positioned in a substantially vertical orientation; the system is further configured to utilize IMU accelerometers while on the ground for determining flight direction in sensor frame based on gravitational vector; and use the flight direction in sensor frame for determining azimuth of the platform notwithstanding IMU frame not being aligned with the platform frame.

17. The navigation system of claim 13, wherein the IMU frame is not aligned with the platform frame, and the platform is positioned in a non-vertical orientation; the system is further configured to utilize IMU accelerometers immediately after launch for determining flight direction in sensor frame based on acceleration measurements vector; and use the flight direction in sensor frame for determining azimuth of the platform notwithstanding IMU frame not being aligned with the platform frame.

18. The navigation system of claim 13, wherein the sensor frame is not aligned with the platform frame, the system is further configured to:
- use IMU accelerometers while on the ground for determining flight direction in sensor frame based on gravitational vector; and
- use IMU accelerometers immediately after launch for determining flight direction in sensor frame based on acceleration measurements vector.

19. The navigation system of claim 13 is further configured for calculating magnetic field values in the auxiliary reference frame, to:
- utilize the at least one computer device for transforming measured magnetic field values in sensor frame to initial sensor frame and for transforming measured magnetic field values initial sensor frame to auxiliary reference frame.

20. The navigation system of claim 13 is further configured for rectifying distortions in in-flight magnetic field measurements, to:
- utilize the IMU magnetometers for performing multiple in-flight magnetic field measurements, each taken at a different time; and the at least computer device is configured to:
- generate equations, each equation is based on a respective in-flight magnetic field measurement and present a relation between the respective in-flight magnetic field measurement measurement, one or more distortions and the Earth's magnetic field; and solve the equations to thereby calculate angle $\Psi_s$, while considering the one or more distortions.

21. The navigation system of claim 20, wherein each in-flight magnetic field measurement is taken while the IMU assumes a different orientation, and wherein the number of in-flight magnetic field measurements is based on the number of one or more distortions, to thereby provide sufficient independent equations needed for rectifying the one or more distortions.

22. A non-transitory program storage device readable by a computer, tangibly embodying a program of instructions executable by the computer to perform a method of in-flight determination of an azimuth of an aerial platform, the platform comprising an inertial measurement unit (IMU); the method comprising:
- obtaining data indicative of Earth magnetic field in navigation frame ($MF_{NF}$) at a flight area of the aerial platform;
- defining an auxiliary reference frame comprising an axis $X_{AF}$ being a projection of an initial IMU sensor frame axis on a plane defined by two of a navigation frame axes, wherein the plane is a horizontal plane, wherein $\Psi_s$ is an angle on the plane, between the projection $X_{AF}$ and a predefined direction on the plane;
- calculating flight direction of the aerial platform in IMU sensor frame based on IMU acceleration measurements;
- during an in-flight phase:
- determining transformation from initial sensor frame to current sensor frame based on IMU in-flight gyro measurements;
- calculating magnetic field values in the auxiliary reference frame based on magnetic field measurements in sensor frame;
- calculating angle $\Psi_s$ based on magnetic field values in the auxiliary reference frame and Earth's magnetic field in the flight area, and thereby obtaining a transformation matrix from sensor frame to navigation frame $C_{SF}^{NF}$; and
- calculating azimuth of the platform based on the flight direction in IMU sensor frame and the transformation matrix $C_{SF}^{NF}$.

23. The non-transitory program storage device of claim 22, wherein the method further comprises, rectifying distortions in in-flight magnetic field measurements, comprising:
- performing multiple in-flight magnetic field measurements, each measurement taken at a different time;

generating equations, each equation is based on a respective in-flight magnetic field measurement and presents a relation between the respective in-flight magnetic field measurements, one or more distortions and the Earth's magnetic field; and solving the equations for calculating angle $\Psi_s$ while considering the one or more distortions.

24. The computer implemented method of claim 1, wherein the platform is a missile or a rocket.

25. The computer implemented method of claim 13, wherein the platform is a missile or a rocket.

26. The non-transitory program storage device of claim 22, wherein the platform is a missile or a rocket.

27. The computer implemented method of claim 1, wherein an axis $Z_{AF}$ of the auxiliary frame coincides with an axis $Z_{NF}$ of the navigation frame.

28. The computer implemented method of claim 13, wherein an axis $Z_{AF}$ of the auxiliary frame coincides with an axis $Z_{NF}$ of the navigation frame.

29. The non-transitory program storage device of claim 22, wherein an axis $Z_{AF}$ of the auxiliary frame coincides with an axis $Z_{NF}$ of the navigation frame.

30. The computerized method of claim 9, wherein the equations are identical or equivalent to:

$$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} =$$

$$C^{SF}_{ISF} C^{ISF}_{AF} \begin{bmatrix} \cos(\psi_S) & \sin(\psi_S) & 0 \\ -\sin(\psi_S) & \cos(\psi_S) & 0 \\ 0 & 0 & 1 \end{bmatrix} \begin{bmatrix} e^{NF}_X \\ e^{NF}_Y \\ e^{MF}_Z \end{bmatrix} + \begin{bmatrix} kdb1_X \\ kdb1_Y \\ kdb1_Z \end{bmatrix}$$

Where:
$k1_X$, $k1_Y$, $k1_Z$ are magnetometer scale factor values;
$h^{SF}_{X_{Meas}}(t)$, $h^{SF}_{Y_{Meas}}(t)$, $h^{SF}_{Z_{Meas}}(t)$ are measured magnetic field values;
$C^{SF}_{ISF}$ is transformation matrix from sensor frame to initial sensor frame;
$C^{ISF}_{AF}$ is transformation matrix from initial sensor frame to auxiliary frame;

$$\begin{bmatrix} \cos(\psi_S) & \sin(\psi_S) & 0 \\ -\sin(\psi_S) & \cos(\psi_S) & 0 \\ 0 & 0 & 1 \end{bmatrix}$$

is transformation matrix from auxiliary frame to navigation frame;
$e^{NF}_X$, $e^{NF}_Y$, $e^{NF}_Z$ are Earth magnetic field values; and
$kdb1_x$, $kdb1_y$, $kdb1_z$ are magnetometer bias values.

31. The navigation system of claim 20, wherein the equations are identical or equivalent to:

$$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} =$$

$$C^{SF}_{ISF} C^{ISF}_{AF} \begin{bmatrix} \cos(\psi_S) & \sin(\psi_S) & 0 \\ -\sin(\psi_S) & \cos(\psi_S) & 0 \\ 0 & 0 & 1 \end{bmatrix} \begin{bmatrix} e^{NF}_X \\ e^{NF}_Y \\ e^{MF}_Z \end{bmatrix} + \begin{bmatrix} kdb1_X \\ kdb1_Y \\ kdb1_Z \end{bmatrix}$$

Where:
$k1_X$, $k1_Y$, $k1_Z$ are magnetometer scale factor values;
$h^{SF}_{X_{Meas}}(t)$, $h^{SF}_{Y_{Meas}}(t)$, $h^{SF}_{Z_{Meas}}(t)$ are measured magnetic field values;
$C^{SF}_{ISF}$ is transformation matrix from sensor frame to initial sensor frame;
$C^{ISF}_{AF}$ is transformation matrix from initial sensor frame to auxiliary frame;

$$\begin{bmatrix} \cos(\psi_S) & \sin(\psi_S) & 0 \\ -\sin(\psi_S) & \cos(\psi_S) & 0 \\ 0 & 0 & 1 \end{bmatrix}$$

is transformation matrix from auxiliary frame to navigation frame;
$e^{NF}_X$, $e^{NF}_Y$, $e^{NF}_Z$ are Earth magnetic field values; and
$kdb1_x$, $kdb1_y$, $kdb1_z$ are magnetometer bias values.

32. The non-transitory program storage device of claim 23, wherein the equations are identical or equivalent to:

$$\begin{bmatrix} k1_X & 0 & 0 \\ 0 & k1_Y & 0 \\ 0 & 0 & k1_Z \end{bmatrix} \begin{bmatrix} h^{SF}_{X_{Meas}}(t) \\ h^{SF}_{Y_{Meas}}(t) \\ h^{SF}_{Z_{Meas}}(t) \end{bmatrix} =$$

$$C^{SF}_{ISF} C^{ISF}_{AF} \begin{bmatrix} \cos(\psi_S) & \sin(\psi_S) & 0 \\ -\sin(\psi_S) & \cos(\psi_S) & 0 \\ 0 & 0 & 1 \end{bmatrix} \begin{bmatrix} e^{NF}_X \\ e^{NF}_Y \\ e^{MF}_Z \end{bmatrix} + \begin{bmatrix} kdb1_X \\ kdb1_Y \\ kdb1_Z \end{bmatrix}$$

Where:
$k1_X$, $k1_Y$, $k1_Z$ are magnetometer scale factor values;
$h^{SF}_{X_{Meas}}(t)$, $h^{SF}_{Y_{Meas}}(t)$, $h^{SF}_{Z_{Meas}}(t)$ are measured magnetic field values;
$C^{SF}_{ISF}$ is transformation matrix from sensor frame to initial sensor frame;
$C^{ISF}_{AF}$ is transformation matrix from initial sensor frame to auxiliary frame;

$$\begin{bmatrix} \cos(\psi_S) & \sin(\psi_S) & 0 \\ -\sin(\psi_S) & \cos(\psi_S) & 0 \\ 0 & 0 & 1 \end{bmatrix}$$

is transformation matrix from auxiliary frame to navigation frame;
$e^{NF}_X$, $e^{NF}_Y$, $e^{NF}_Z$ are Earth magnetic field values; and
$kdb1_x$, $kdb1_y$, $kdb1_z$ are magnetometer bias values.

33. The non-transitory program storage device of claim 23, wherein each in-flight magnetic field measurement is taken while the IMU assumes a different orientation, and wherein a number of in-flight magnetic field measurements is based on a number of one or more distortions, to thereby provide sufficient independent equations needed for rectifying the one or more distortions.

34. A non-transitory program storage device readable by a computer, tangibly embodying a program of instructions executable by the computer to perform a method of in-flight determination of an azimuth of an aerial platform, the platform comprising an inertial measurement unit (IMU); the method comprising:
- obtaining data indicative of Earth magnetic field in navigation frame ($MF_{NF}$) at a flight area of the aerial platform;
- defining an auxiliary reference frame comprising an axis $X_{AF}$ being a projection of an initial IMU sensor frame axis on a plane defined by two of a navigation frame axes, wherein the plane is a horizontal plane, wherein $\Psi_s$ is an angle on the plane, between the projection $X_{AF}$ and a predefined direction on the plane;
- obtaining flight direction of the aerial platform in IMU sensor frame;
- during an in-flight phase:
- determining transformation from initial sensor frame to current sensor frame based on IMU in-flight gyro measurements;
- calculating magnetic field values in the auxiliary reference frame based on magnetic field measurements in sensor frame;
- calculating angle $\Psi_s$ based on magnetic field values in the auxiliary reference frame and Earth's magnetic field in the flight area, and thereby obtaining a transformation matrix from sensor frame to navigation frame $C_{SF}^{NF}$; and
- calculating azimuth of the platform based on the flight direction in IMU sensor frame and the transformation matrix $C_{SF}^{NF}$.

35. The non-transitory program storage device of claim 32, wherein the method further comprises, rectifying distortions in in-flight magnetic field measurements, comprising:
- performing multiple in-flight magnetic field measurements, each taken at a different time;
- generating equations, each equation is based on a respective in-flight magnetic field measurement and presents a relation between the respective in-flight magnetic field measurement, one or more distortions and the Earth's magnetic field; and solve the equations to thereby calculate angle $\Psi_s$, while considering the one or more distortions.

* * * * *